United States Patent [19]

Deml et al.

[11] 3,891,975

[45] June 24, 1975

[54] METHOD AND ARRANGEMENT FOR RECORDING THE PHASE DISTRIBUTION OF AN OBJECT WAVE STORED IN A HOLOGRAM

[75] Inventors: Reinhold Deml, Munich; Ulrich Greis, Weyarn; Friedrich Bestenreiner, Grunwald; Josef Helmberger, Munich, all of Germany

[73] Assignee: Agfa-Gevaert Aktiengesellschaft, Leverkusen, Germany

[22] Filed: June 14, 1973

[21] Appl. No.: 370,098

[30] Foreign Application Priority Data

June 16, 1972 Germany ............................ 2229381

[52] U.S. Cl......... 340/173 LM; 340/173 R; 350/3.5; 350/162 SF; 358/2

[51] Int. Cl........................ G02b 27/38; G11c 13/04

[58] Field of Search................. 340/173 R, 173 LM; 178/6.5, 6.8; 358/2; 350/3.5, 162 SF; 179/100.3 G

[56] References Cited

UNITED STATES PATENTS 3,641,264 2/1972 Macovski............................ 178/6.5

OTHER PUBLICATIONS

Kozma et al., Spatial Filtering for Detection of Signals Submerged in Noise, 4/65, Applied Optics, Vol. 4, No. 4, pp. 387–392, 350/162 SF.

Brown et al., Computer-generated Binary Holograms, IBM J. Res. Develop., 3/69, pp. 160–168.

*Primary Examiner*—Stuart N. Hecker

*Attorney, Agent, or Firm*—Michael S. Striker

[57] ABSTRACT

The object wave stored in the hologram has intensity maxima. The hologram is scanned and a pulse is furnished for each of the intensity maxima. This creates a spatial distribution of pulses. The spatial integral of this pulse distribution is carried out. The resulting signal, which represents the phase distribution of the object wave stored in the hologram, is recorded on a suitable recording medium.

44 Claims, 20 Drawing Figures

METHOD AND ARRANGEMENT FOR RECORDING THE PHASE DISTRIBUTION OF AN OBJECT WAVE STORED IN A HOLOGRAM

BACKGROUND OF THE INVENTION

This invention relates to a method and arrangement for recording the phase distribution of an object wave stored in a hologram. The only previously known method of recording light field distribution with respect to both amplitude and phase was the creation of an interference pattern, that is a hologram. This has the disadvantage that the holograms can only be reconstructed by optical means having a very poor efficiency and further that, if a transmission of a hologram from one location to another is desired, a high bandpass is required.

The low frequency signal representing the amplitude of the wave may be derived readily and recorded in an absorption medium. However until the present time it has not been possible to record the low-frequency phase signal of the hologram by transforming this signal into an intensity distribution and recording this intensity distribution in a light sensitive refractive medium as for example a bleached photographic layer. Such a medium allows the fields resulting from a spatial wave front to be recorded with 100% efficiency.

SUMMARY OF THE INVENTION

It is an object of the present invention to furnish a method and arrangement for recording the phase component of an object wave stored in a hologram. In accordance with a method of the present invention, the hologram is phase demodulated and the resultant phase signal is recorded. Specifically, the density maxima of the hologram recording are transformed into a pulse grating and the pulses in this grating are summed up and the resulting signal is recorded. In a preferred embodiment of the present invention a hard copy is first made of the hologram, thereby eliminating amplitude modulation. A pulse grating is then created which has a pulse for each density maximum of the resultant hologram. In a preferred embodiment of the present invention the resultant pulse grating which has pulses of varying and rather broad pulse widths is transformed into a second pulse grating having narrower pulses of equal pulse width. This can be achieved photographically, for example by utilization of the so-called "neighborhood effect," which is described in the article by Mees, "The Theory of the Photographic Process," pages 871–894 found in the Photographic Manual published in 1942 by the MacMillan Company, New York by overexposure during the copying process, by partial solarization, by use of a non-sharp mask or by use of equidensity film. The pulse width can of course also be changed by electrophotographic copying.

In a preferred embodiment of the invention, in order to facilitate the subsequent step, it is desirable that the transformation of the hologram into a pulse grating as described above is accompanied by an optical enlargement, that is by enlargement of the surface of the recording.

After creating of the pulse grating, the pulses in the grating are then subjected to a spatial integration and the resulting signal is recorded. Alternatively, the pulses in the pulse grating are scanned at a constant velocity, resulting in a timed pulse sequence which is then integrated with respect to time and the resulting signal recorded.

For recording medium a photographic layer which has been bleached is appropriate, as is a chrome gelatin, a photoplastic film, thermoplaste, lithium niobate crystals or a gelatin layer.

In a preferred embodiment of the present invention the pulse grating is converted into electrical signals which are used to control a mechanical engraving machine which engraves a relief corresponding to the phase signal into a solid material. This material can be metallic or it can be light refractive material. Of course copies can be made from a metallic relief.

The summing of the pulses will, as shown below, result in an ever increasing intensity profile. In a preferred embodiment of the present invention an unmodulated intensity signal having a slope of opposite sign to the slope of the first-mentioned intensity profile is added thereto. The resulting sum of the intensities of course comprises an unmodulated D.C. component which can then be separated by a threshold process.

It is of course also possible to convert the pulses into electrical signals and create a signal having a constant D.C. component by use of an electronic arrangement which adds an appropriate sawtooth voltage.

Instead of the above-mentioned photographic transformations it is also possible to project the hologram onto a camera tube having high resolution and then to scan the resulting charge distribution electronically. The D.C. component of the signal of course can be removed by either capacitive or transformer coupling, while the A.C. component is transformed into rectangular pulses by means of a Schmitt trigger. The pulses at the output of the Schmitt trigger are differentiated, the so-differentiated signals being used to trigger a monostable multivibrator which at its output then furnishes a pulse in response to each of the trigger signals. The output of the monostable multivibrator of course has a constant pulse width which is adjusted to be a relatively narrow pulse width. The phase information is recorded by means of high resolution point source scanning tubes or by means of a conventionally controlled laser or cathode ray beam onto a light sensitive material.

The phase signal of course can also be recorded by means of a conventional TITUS tube or a lumatron tube.

In accordance with the present invention an arrangement for summing and recording the pulses of the pulse grating with respect to space consists of a diffuser or cylinder lens arrangement which illuminates the pulse grating, a scanning edge which is moved at a constant velocity past the pulse grating and a recording slit which is positioned in front of the recording medium in a direction parallel to the scanning edge. The recording medium is moved at a constant velocity in a direction perpendicular to the scanning slit. The scanning edge may comprise a material which is opaque and has a very sharp and clearly defined edge.

In another arrangement according to the present invention, the illuminating system which forms part of the scanning means comprises a light source and two cylinder lenses whose axes are perpendicular to each other. A third cylinder lens is arranged between the hologram and the recording medium for focussing the light which is not blocked by the scanning edge onto the recording medium. In this arrangement, the recording medium is again moved at a constant velocity past a slit which is positioned between the above-mentioned third cylinder lens and the recording medium.

For a two-dimensional evaluation, the pulse grating is scanned in a line-by-line scan by means of a pinhole and a transport arrangement which operates in a direction perpendicular to the scanning direction.

A further arrangement for summing the pulses with respect to time comprises a laser which serves as a light source for scanning the pulse grating, a cylinder lens for focussing the laser beam onto the pulse grating, a second cylinder lens having a cylinder axis perpendicular to the cylinder axis of the first lens and positioned between the pulse grating and the recording medium for focussing the pulse grating onto the recording medium, and a scanning edge which moves in front of the recording medium in the scanning direction. The velocity of the scanning edge differs from the velocity of the scanning laser beam.

In another arrangement according to the present invention, the hologram is processed without an additional copying process. That is, the hologram is processed directly without first creating the pulse grating. In an arrangement in accordance with this embodiment, the source of illumination is again a laser beam. The laser beam is divided into a first and second beam. The first beam travels along a predetermined path through the hologram and from there onto the recording medium. The second beam is focussed on the hologram in a different direction from the first beam and falls upon a photodetector positioned behind the hologram in the path of the light beam. When the photodetector receives sufficient light, a pulse is generated which controls a Kerr cell which is positioned in the path of light of the first light beam prior to the time it impinges upon the hologram. The Kerr cell changes from an opaque to a transmissive condition in response to the signal from the photodetector. In this embodiment also a scanning edge is positioned in front of the recording medium and is moved at a constant velocity with respect to the recording medium. The hologram itself is of course also moved in a direction parallel to the direction of motion of the scanning edge.

In a further arrangement, a sheet of photochrome material is positioned behind the hologram during the scanning process. Alternatively a layer of fluid crystals in combination with a photoconductive layer, or a dye-laser layer may be positioned behind the hologram and used to generate the phase signal as will be described below.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
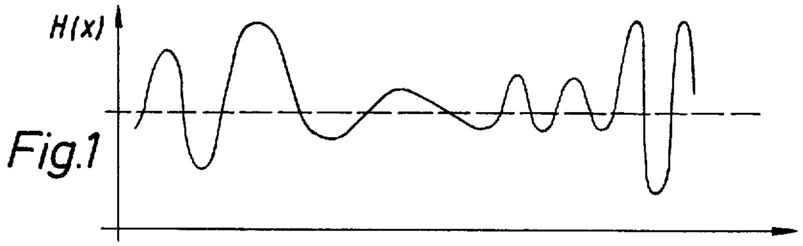
FIG. 1 is schematic diagram showing the amplitude and phase modulation of a holographic grating.

A preferred embodiment of the present invention will now be described with reference to the drawing.

According to the theory developed by D. Gabor, any optical wave, therefore including the wave created by an object, can be unambiguously defined by the amplitude $f(x,y)$ and phase $\phi(x,y)$ in any plane (X,Y) between the object and the observer. The only known method for recording $f(x,y)$ and $\phi(x,y)$ is to create an interference pattern by means of a reference beam and to record the resulting pattern photographically as a hologram. The original object is normally reconstructed from the hologram in an optical defracting manner. This has the disadvantage that a whole sequence of orders of defraction is created and the efficiency is only a few percent. This disadvantage can be reduced in theory by the use of "blazed" holograms or "thick" recording media. However, experimentally no really effective reconstruction of real objects has been achieved.

In order to separate the different orders of defraction from one another, an off-axial reference beam is required. This leads to a carrier grating of high spatial frequency, onto which are modulated the signals $f(x,y)$ and $\phi(x,y)$. Under certain circumstances one would like to transmit a hologram either optically or electronically. This can often not be done because the available bandpass is too small for the high carrier frequencies by several orders of magnitude.

However, for optical reproduction of electronic transmission the complete hologram is not actually required. It is actually sufficient to have the two low frequency signals $f(x,y)$ and $\phi(x,y)$. This reduces the required bandpass to such an extent that the normally available bandpass region is approximately double the bandpass required for transmission of a normal picture.

The present invention shows a method and arrangement for deriving the functions $f(x,y)$ and, more especially, $\phi(x,y)$ by demodulation from the hologram and for creating a refracting medium corresponding to the phase signal $\phi$. For a single object point this means that the holographic zone lens is transformed into a conventional lens or a Fresnel lens. A planar object wave which leads to a linear holographic recording, is, in this fashion, represented by a prism or a Fresnel prism.

The structure $H(x,y)$ stored in the hologram is a modulated grating having the form:

$$H(x,y) = f(x,y)\sin\{\omega x + \phi(x,y)\} + K;$$

where $f(x,y)$ is an amplitude modulation and $\phi(x,y)$ is a phase modulation. FIG. 1 shows this structure in a one-dimensional case. Depending on the type of hologram, the amplitude modulation is more or less pronounced. One limiting case is the Fourier hologram, where, because of the great dynamic range of $f(x,y)$ all degrees of modulation from 0 to 1 appear. The other extreme is the recording of an object which is illuminated with a diffusing lens and recorded as a Fresnel hologram. In this case the amplitude modulation is almost constant and the whole information is in the phase portion $\phi(x,y)$.

Amplitude demodulation of the hologram is, insofar as it is required at all, relatively simple. It is accomplished by a lowpass filter recording, that is a recording in which the resolution is insufficient for the carrier grating. In this manner one can produce a photograph having a transparency $\tau_A(x,y)$ such that $\tau_A(x,y)$ is approximately equal to $f(x,y)$.

More complicated and considerably more important is a phase demodulation, for which a radically new method will be proposed. The solution lies in transforming the maxima (or minima) of the holographic grating into pulses which then are counted and summed up started at any arbitrary predetermined point.

Figure 2:
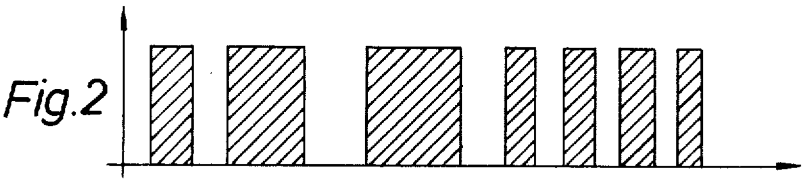
FIGS. 2 and 2*a* show a transformation of the phase signal into a sequence of pulses.

As a first step the hologram is subjected to hard copying in order to eliminate the amplitude demodulation (FIG. 2). This step can of course be omitted for holograms which are recorded with a diffusing disk.

Figure 2A:
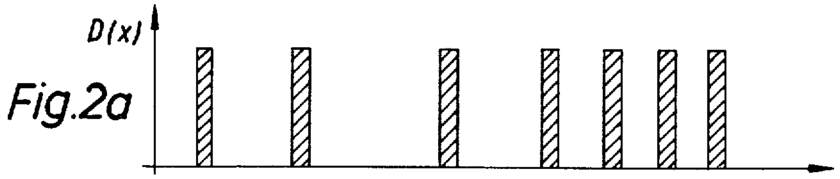

As shown in FIG. 2, the resulting pulse grating, herein referred to as the first pulse grating has pulses of varying pulse width. It will be noted that the position of the pulses relative to the maxima or minima of the wave form shown in FIG. 1 is unimportant, as long as the spacing between pulses corresponds to the spacing between the associated maxima or minima. Thus the pulses could equally well be derived at the crossover points of $H(x)$ shown in FIG. 1. The pulse grating shown in FIG. 2 is then transformed into the second pulse grating having a pulse for each of the pulses of the first pulse grating, but of a narrower pulse width. The resulting pulse grating is shown in FIG. 2*a*. There are a number of processes available for reducing the pulse grating of FIG. 2 to that of FIG. 2*a*. These include photochemical developing, use of the so-called "neighborhood effect" and/or overexposing during the copying process, and/or partial solarization, or the use of nonsharp masks, use of equidensity processes, electrographic recording, or spatial frequency filtering with coherent projection. In the possibly substantially enlarged picture of th hologram, the phase information $\phi(x,y)$ is pictured as a sequence of equally light narrow pulses $D(x,y)$ which have different spacings from each other. $D(x,y)$ is defined as:

$$D(x,y) = 1 \text{ for } \left(x_M - \frac{\epsilon}{2}\right) \leq X \leq \left(x_M + \frac{\epsilon}{2}\right);$$

where $x_M$ is determined by the $$\left(\frac{\partial H}{\partial X}\right)_{x=x_M} = 0;$$

and the second $$\left(\frac{\partial^2 H}{\partial x^2}\right)_{x=x_M} < 0;$$

$D(x,y) = 0$ in all other locations.

As shown in equation 2, the differentiation must take place in the scanning direction. The above-mentioned process results in a two-dimensional differentiation relative to both $x$ and $y$. The latter, if required, can be eliminated in the $y$ direction during further processing.

During the original taking of the hologram the above-mentioned pulse sequence can be achieved directly, if, instead of a conventional method, a multibeam interference method is used. As known from interferometry, originally broad interference bands may be changed into narrow maxima by use of multibeam interference. In holography, this means the use of a plurality of reference beams at angular positions relative to each other which correspond to the higher Fourier components in the interference pattern which results from the combination with the object beam. These reference beams may either be furnished separately or may be derived from a joint refraction grating.

The above-mentioned use of multibeam interference patterns for narrowing the interference bands is described in the textbook Born and Wolf: Principals of Octics, 3rd edition, page 362. The use of multiple reference beams does not result in any pulses from the differentiation in the $y$ direction.

Figure 3:
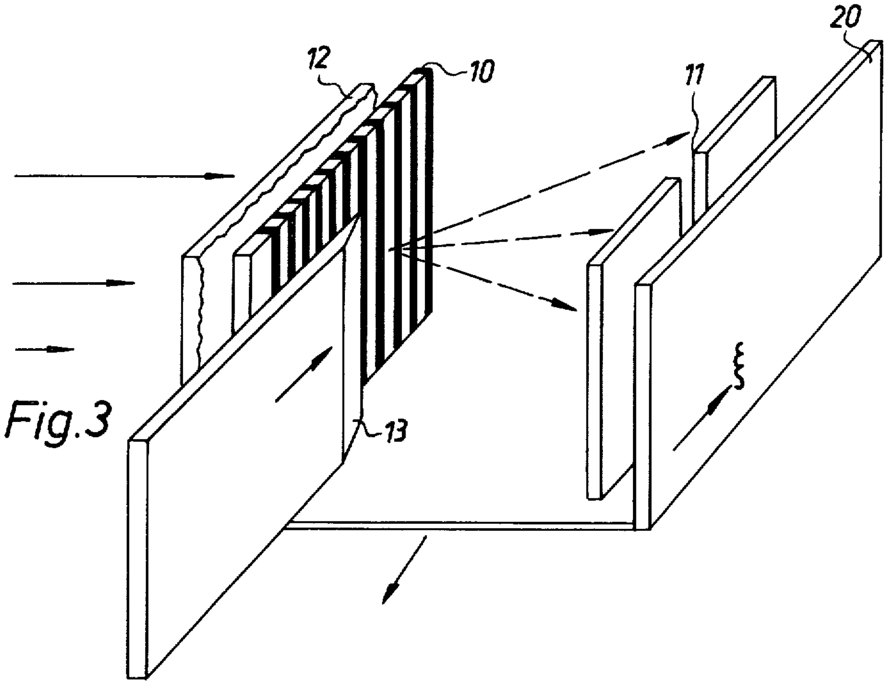
FIG. 3 shows an arrangement for transforming the phase signal into an intensity distribution by means of spatial integration.

The integration process will first be described for a one-dimensional holographic grating. As shown in FIG. 3, the modified hologram 10 is to be recorded onto a light sensitive medium 20. By modified hologram we mean a hologram which has been converted into a pulse grating as shown in FIG. 2*a*. For this purpose, the pulses which each correspond to a particular phase variation are to be counted and summed up. The grating 10 having the phase information $\phi(x)$ is illuminated in such a manner that from each point light falls onto the scanning slit 11. This can be accomplished by use of a diffuser 12, as shown in FIG. 3, or alternatively, by a cylinder lens Z1 in front of grating 10 or an Ulbricht sphere in front of slit 11.

Grating 10 is scanned by the scanning edge 13 which is moved with a constant velocity $v$. The grating is thus transformed into a time varying intensity signal. A scanning edge 13, one embodiment of scanning means, can be either an actual material edge or, alternatively, the image of a movable edge (rotary mirror). The recording medium 20, one embodiment of recording means, is moved behind slit 11 in the direction shown by the arrow, thus creating a spatial distribution from the time intensity function. Thus the function $I(\xi)$ which is recorded is the following:

$$I(\xi) = \int_0^{\xi} D(x)dx$$

Figure 4A:
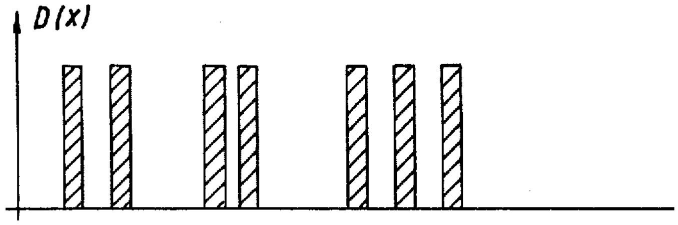
FIGS. 4*a* and 4*b* show, respectively, a pulse grating and the signal resulting from the integration of the pulses in the grating.
Figure 4B:
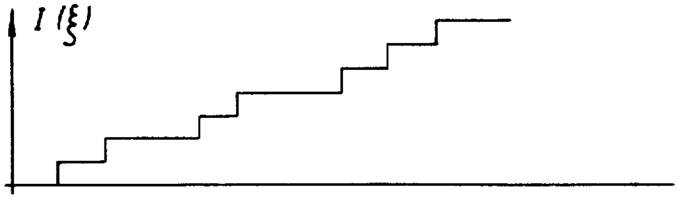

The sequence of pulses (FIG. 4*a*) is thus transformed into a step function (FIG. 4*b*) which, for a recording material having a suitable gradation is proportional to the phase variation. The slope of the curve of FIG. 4*b* can of course be determined by the gradation selected. Further, the steps in the curve can be substantially smoothed out by choice of the material or by the choice of the correct modulation transfer function.

Figures 5A, 5B:
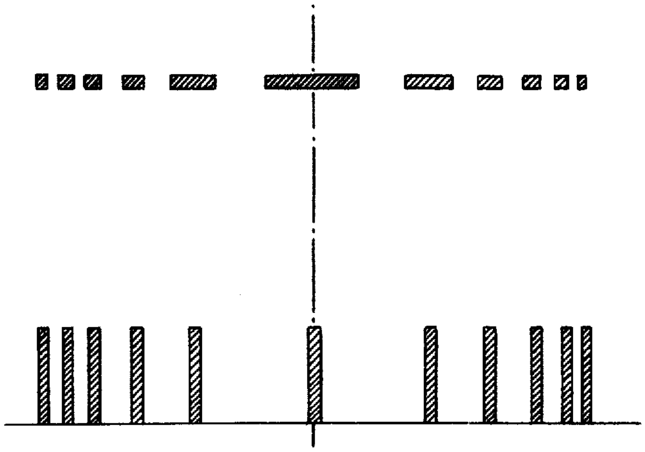
FIGS. 5*a*–5*c* show an example of the carrying out of the method of the present invention.
Figure 5C:
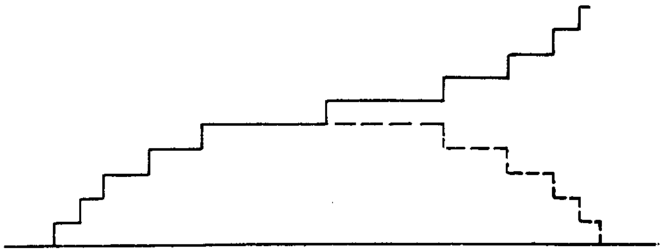

The summing up process is continued even if the location of phase 0 is crossed during the scanning operation. The phase 0 herein refers to the spot on the hologram where the reference angle is 0, or as shown in FIG. 5*a*, the spot on the hologram where the optical axis crosses same. In such "in-line" cases the virtual image is also recorded. This will be described briefly with reference to an in-line cylinder zone lens. FIG. 5*a* shows a cross-section through the zone lens the pulse sequence and resulting phase profile are shown in FIGS. 5*b* and 5*c*, respectively. It is seen that this constitutes a combination of a focussing and diffusion lens as is the case in a zone lens. For practical purposes, only the "off-axis" arrangement is usable. In the in-line case one should only sum up to the axis and then recommence the scanning from the other side as indicated in FIG. 5*c*, by the dashed curve. However, the boundery condition must be considered, namely the summing in each line must commence at a point of equal absolute phase $\phi_o$, a condition which can be realized in practice to a very close approximation.

If the effect of gradation is neglected, the focal length of the lens is given by the pulse sequence. If the zone lens were copied using a non-sharp mask or coherent differentiation, then the further focal length of the zone lens will result, corresponding to the degree of the differential quotient. These further focal lengths of course correspond to the higher orders of defraction.

Generally speaking, the above-described process can also be applied to two-dimensional hologram structures. In this case the scanning is done line-by-line, along a small slit, the scanning slit 11 is replaced by a pinhole and the recording is carried out line-by-line.

Figures 6, 7:
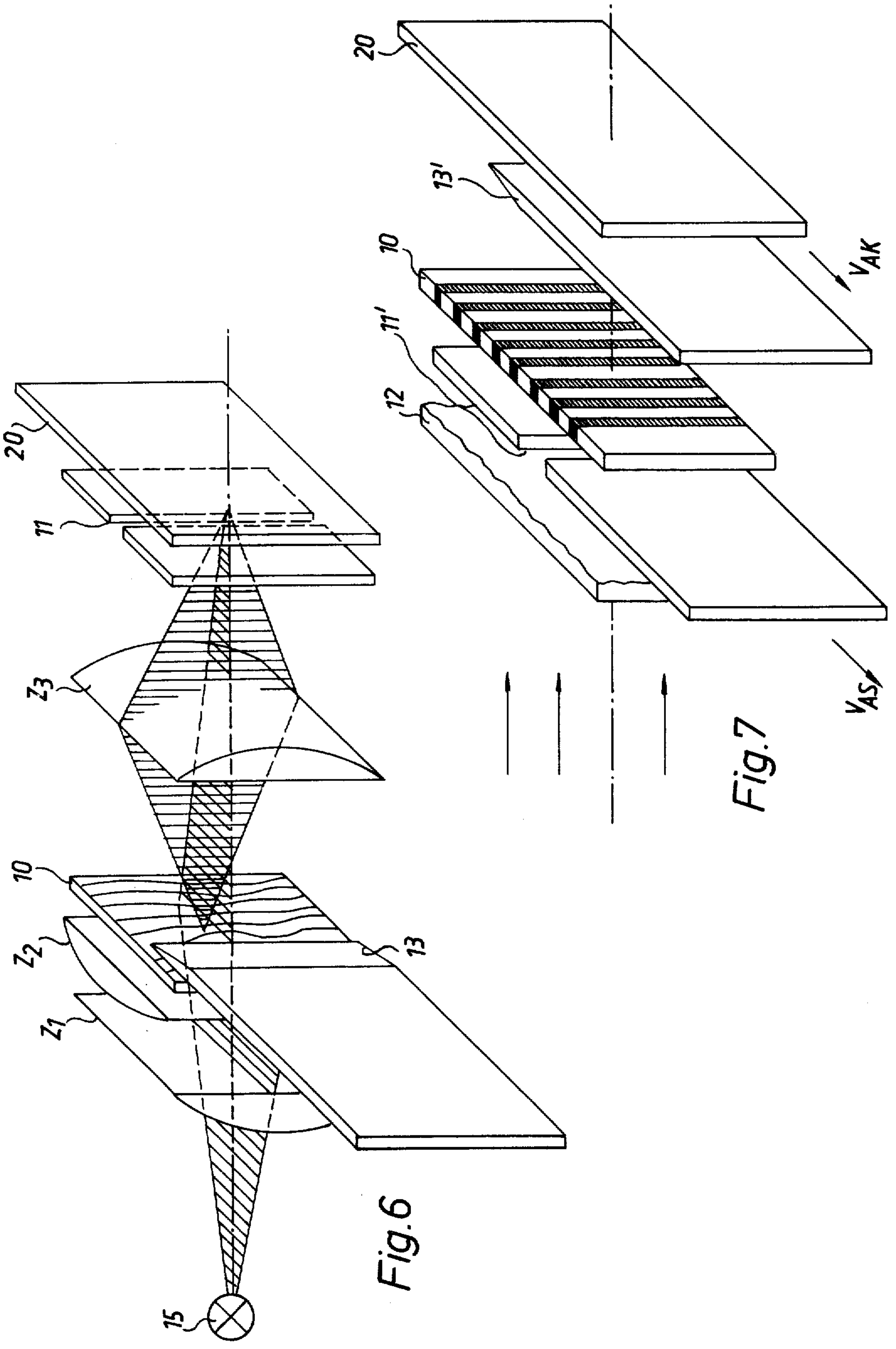
FIG. 6 is an arrangement for transforming the phase signals into a density distribution or an optical path length change.
FIG. 7 is a schematic arrangement for integrating with respect to time.

A suitable arrangement is shown in FIG. 6. The holographic pulse grating 10 is projected by means of cylinder lens $Z_3$ onto the scanning slit 11. Scanning means comprise a source of illumination 15, and an astigmat, comprising a first cylinder lens $Z_1$ and a second cylinder lens $Z_2$, whose cylinder axis is perpendicular to that of axis $Z_1$, has the function of illuminating the grating 10 in such a manner that from each point in a section through the grating all light (or an equal amount of light from each point) falls onto slit 11. The individual cross-sections, that is lines, are projected one on top of the other by means of lens $Z_3$. The further procedure utilizing the arrangement in FIG. 6 is the same as that for the one-dimensional case. The signal appearing at the slit is a time and space varying intensity signal $I(t,y)$, which, by movement of the recording means is recorded as a two-dimensional spatial distribution $I(\xi,y)$.

$$I(\xi,y) = \int_0^{\xi} D(x,y)DX$$

In a further preferred embodiment of the present invention, the pulse sequence $D(x,y)$ is transformed into a time function which is subsequently integrated with respect to time. If the scanning is carried out at constant velocity, this procedure is similar to an integration with respect to space. Analogous to equation 4 above, is the following:

$$t = \frac{x}{v}$$

$$I(\tau,y) = \int_0^{\tau} D(t,y)dt$$

$$\tau = \frac{\xi}{v}$$

It will be noted with reference to FIG. 7, that the scanning slit 11' and the scanning edge 13' have been exchanged. They are moved simultaneously at a constant velocity of, respectively, $v_{AS}$ and $v_{AK}$. The recording material 20 is thus exposed for different time periods in different locations.

Figure 8A:
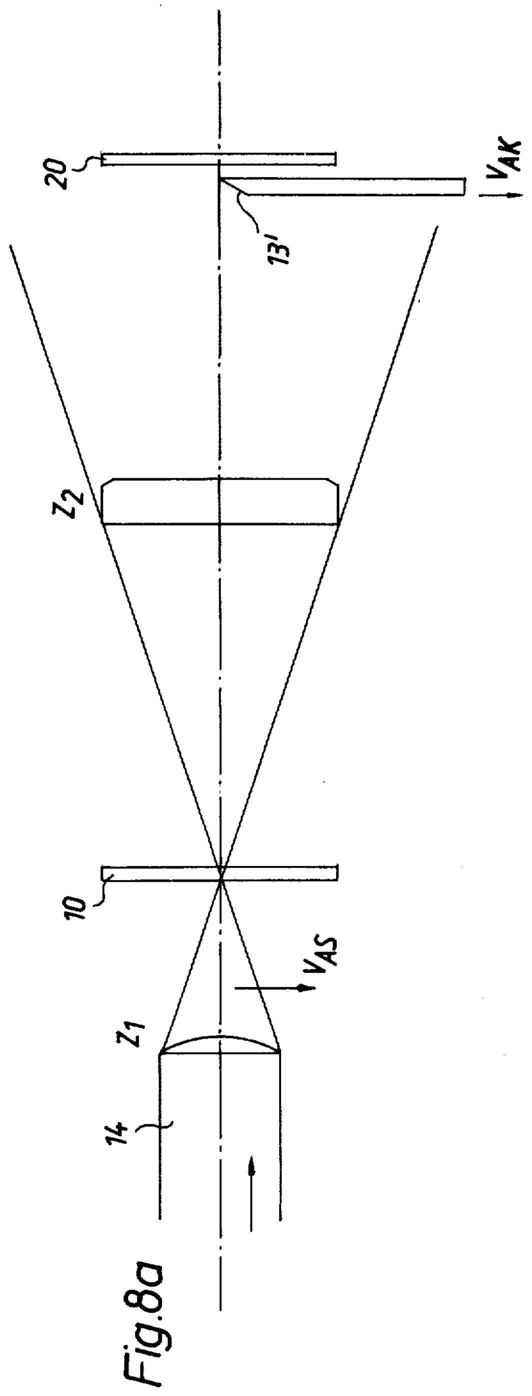
FIGS. 8*a* and 8*b* show an alternate arrangement for integration with respect to time.
Figure 8B:
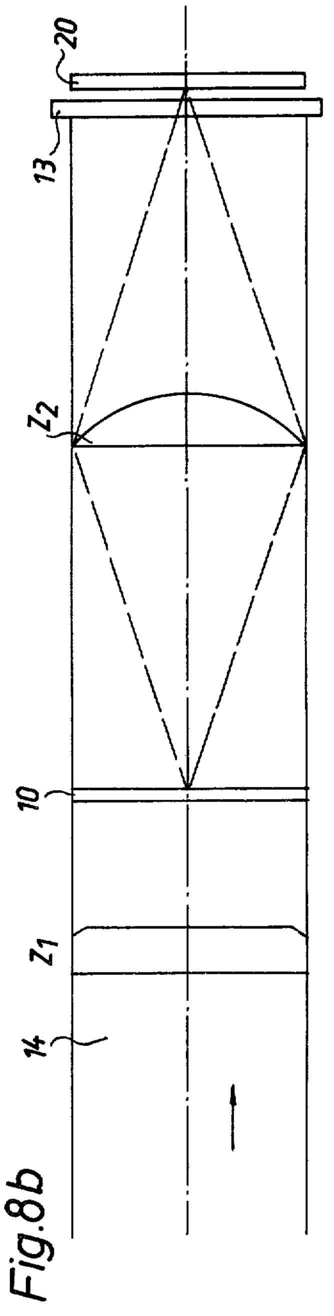

FIG. 8*a* shows the demodulation of a two-dimensional hologram structure. It will be seen that the scanning slit 11' is replaced by a cylinder lens $Z_1$ which focusses a laser beam 14. FIGS. 8*a* and 8*b* show a top view and side view respectively of the arrangement. Zone lens $Z_2$ is positioned between hologram grating 10 and recording medium 20. It projects the hologram line-by-line. The gradation of the transformation of the intensity distribution into an optical length of path function is determined both by the recording material and by the scanning movement.

$$v_{AS} = v_{AK} = f(t)$$

where, for the special case of a linear projection $$f(t) = \text{const}$$

More generally:

$$v_{AS} = f_1\ (t)$$

and $$v_{AK} = f_2\ (t)$$

that is, a one-dimensional distortion, an enlarging or a reduction in size takes place in the direction of scan.

For the case of an integration with respect to time, the original hologram may also be directly processed, if the light of the scanning slit, which in this case is not an actual material scanning slit, is controlled.

Figure 11:
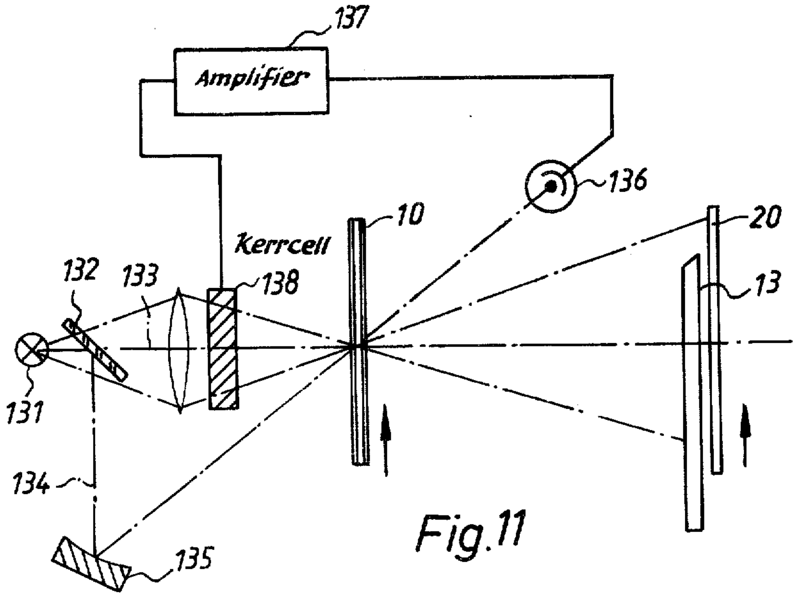
FIG. 11 shows an arrangement for processing a hologram in accordance with the present invention, without creating a pulse grating.

FIG. 11 shows such an arrangement. In FIG. 11 reference numeral 131 designates a laser which furnishes a laser beam which is split into a first beam 133 and a second beam 134 by means of a semitranslucent mirror 132. The second beam 134 impinges upon a mirror 135 which reflects it through hologram 110 (which in this case is the unprocessed hologram) onto a photoreceiver 136. When the intensity of light received by the photoreceiver exceeds a predetermined intensity, the photoreceiver furnishes a signal which, after amplification an amplifier 137 switches the Kerr cell 138 from an opaque to a transparent state. Kerr cell 138 is positioned in the path of the light from the first beam namely beam 133. When the Kerr cell is transparent, light impinges upon hologram 10 and falls upon the portion of the recording means 20 which are exposed in the particular position of the scanning edge 13. Hologram 110 is moved at a constant velocity in the direction of the arrow, as is recording medium 120. The pulse sequence $D(x,y)$ is thus created by use of the Kerr cell.

The same result may be achieved by use of a fast photochrome layer positioned behind the hologram. The time constant of the photochrome layer determins the pulse width.

The same effect may be achieved by a layer of liquid crystals in combination with a photoconductive layer. The latter becomes conductive when light impinges thereon and causes the crystals at the corresponding location to become transparent (or opaque). Further information regarding the use of liquid crystals may be found in the literature as follows: T. D. Beard "Photoconductor Light-Gated Liquid Crystals used for Optical Data," Optical Society of America, October, 1971 page 1559. Annual Meeting and S. P. Richard, A. S. -Marathay "Cholesteric Liquid Crystals for Optical Processing".

In a further preferred embodiment of the present invention, a dye-laser image amplifier may be utilized as described in T. W. Hansch, F. Varsanyi, A. L. Schawlow "Image Amplification by Dye Lasers," Applied Phys. Lett. 18, 1971, p. 108.

A suitable dye-laser layer behind the hologram is pumped until close to laser emission. The small additional energy contributed by the scanning at the location of the maxima in the grating cause the laser effect to be reached. For this purpose, the hologram must already have undergone a hard copying process, that is the hologram must have the form shown in FIG. 2. The dye laser in itself automatically performs the transformation into individual pulses of equal pulse width. If required, of course the pumping light which is focussed onto a narrow strip must be transported along with the scanning slit.

Figure 12:
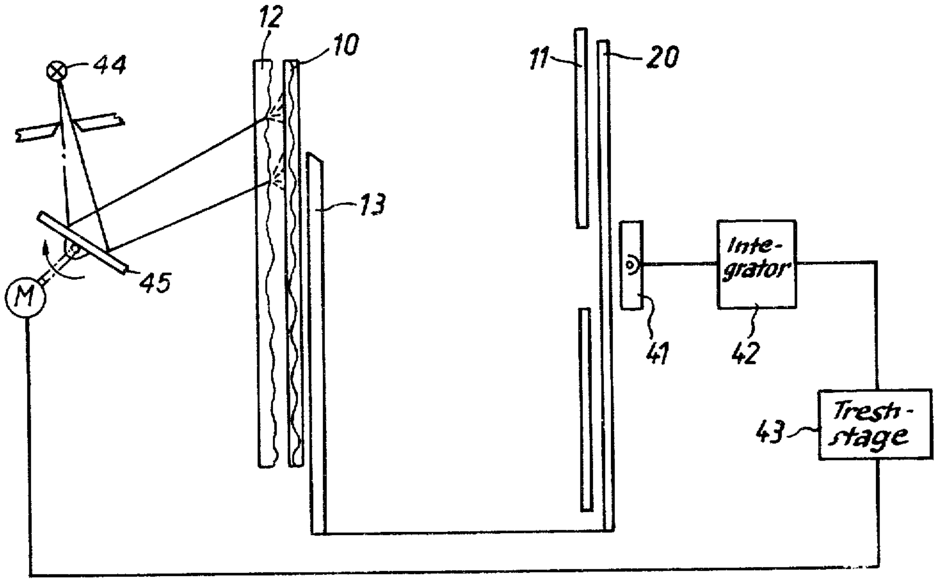
FIG. 12 shows an arrangement for limiting the phase variation recorded in the recording medium to a predetermined phase variation.

The object of the method of the present invention is of course a recording in a phase medium as an optical wavelength distribution $\Lambda(x,y)$. Since the phase media known at this particular time cannot be modulated to the same phase range as are lenses and prisms, it becomes practical to sum the phase angle only to a relatively small multiple of the wavelength $\Lambda$, where $\Lambda$ is the wavelength of the reconstructing light. The phase sumation is then restarted at phase 0 analagous to the operation of a Fresnel lens. Experimentally, this is achieved in a simple fashion by extending the integration region only up to a predetermined limit. An arrangement for accomplishing this is shown in FIG. 12. Shown in FIG. 12 is a light source 44 which furnishes a relatively broad beam to a mirror 45 which reflects the beam onto the hologram 10 through a diffuser 12. Scanning slit means 11 are positioned in front of recording medium 12 in the direction of light propagation from hologram 10, while scanning edge 13, when moved in the direction of the arrow, serves to continuously uncover increasing portions of hologram 10. The light generated by light source 44 passes through hologram 10 and the slit of the scanning slit means 11 onto recording medium 20. Positioned behind recording medium 20 is a photocell 41 whose output is connected to the input of an integrator 42. The integrator integrates the signal furnished by the photocell and has an output corresponding to the total quantity of light which is formed on the recording medium. The output of the integrator is connected to the input of a threshold stage 43 which, when a predetermined signal appears at its input furnishes a signal to motor 43, which is a step motor. This signal causes the motor to advance one step. The motor is mechanically coupled to rotary mirror 45 which, as previously mentioned reflects a beam onto the hologram. Thus a well-defined region of the hologram is illuminated for each step of motor 43. Recording medium 20 is of course transported past the slit in slit means 11 synchronously with the transport of scanning edge 13 past the hologram.

Simultaneously a gamma correction can be carried out by means of an electro-optical modulator on the illumination side.

At this time the following recording media are useful:

A photographic layer with bleaching (variation of the refraction index *n* and thickness layer *d*) or chrome gelatin, or photoplastic film (see J. E. Bigelow "A Photoplastic Film Recording Terminal" SPSE*, New York, Sept. 23, 1971 page 92). Further, the use of photoresist layers, photoplastics, crystals such as $LiNbO_3$, etc. or a gelatin relief in accordance with the technicolor process are also useful.

Further, the signal which results from the above-described optical coating process and which is proportional to the magnitude of the phase variation, may be used to control an engraving machine which engraves a relief corresponding to the phase variation into light refractive material.

*) Society of Photographic Scientists and Engineers

Figure 9A:
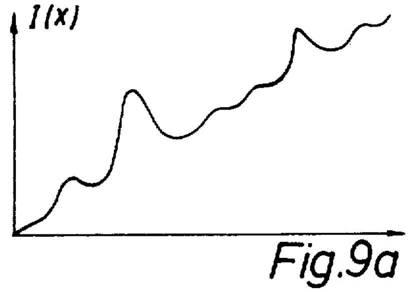
FIGS. 9*a*–9*d* show, schematically, the compensation of an off-axis hologram.
Figure 9B:
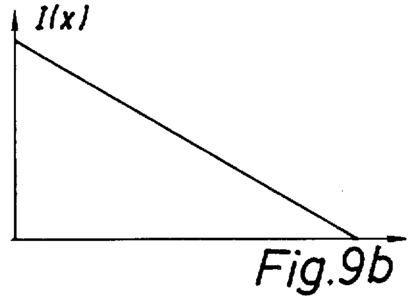
Figure 9C:
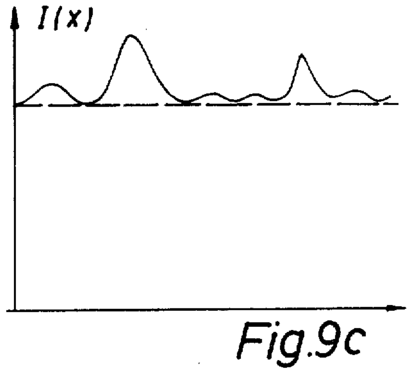
Figure 9D:
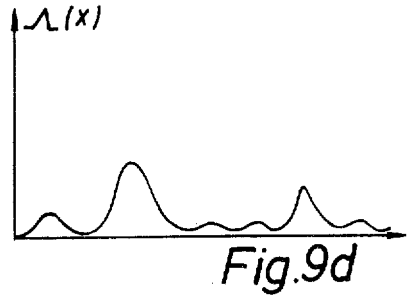

Further the possibility exists to copy a relief onto synthetic material and then to reproduce. Transformation of the generally used off-axis hologram of course yields a carrier grating in the form of a prism having an equal refractive index, with superimposed object structure. Since for observation an in-line image is preferable, this effect can be compensated for subsequently by combination with a prism of opposite refraction. However, in order to keep the phase variation in the recording material as small as possible, it is better to carry out the compensation of the original profile (see **FIG. 9*a*) in the transformation process itself. This can for example be accomplished by adding an intensity function of opposite slope (rate of change with respect to distance) to the function shown in FIG. 9*a*. Such a function is shwon in FIG. 9*b*. Addition of the wave forms of FIGS. 9*a* and 9*b* results in the wave form of FIG. 9*c* which has a constant D.C. component with superimposed modulation in accordance with the wave form created by the object. The D.C. value can of course be separated by a threshold process which may be photographic. The resulting signal is then shown in FIG. 9*d*.**

Figure 10:
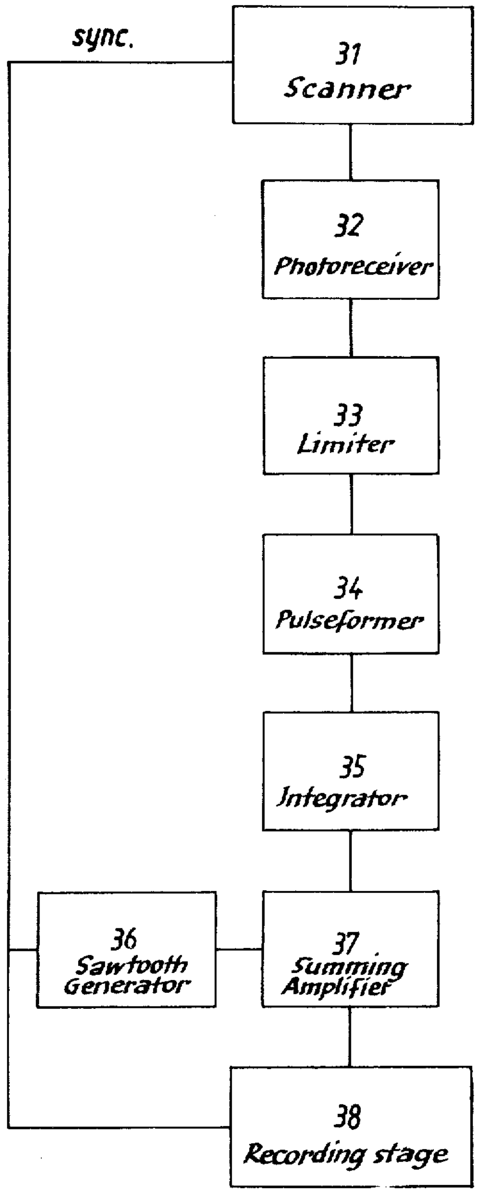
FIG. 10 is a block diagram for carrying out electronic integration.

The above-described operations can be carried out advantageously with electronic equipment. The basic principle is again the principle of marking the locations having the same phase by means of a pulse and then subsequently summing these pulses. A simple block diagram is shwon in FIG. 10. A scanning means 31 furnishes a signal to photoreceiver 32 which is limited in a limiter stage 33. The so-limited signal is applied to a pulse former 34 which furnishes a pulse sequence which then is summed by means of a digital counter or an analogue integrator 35. The above-described in-line transformation can then be accomplished by addition of a sawtooth wave furnished by sawtooth generator 36 which is synchronized with scanner 31. The signal from the sawtooth generator 36 as well as the signal output of integrator 35 are combined in a summing amplifier 37 whose output signal is then recorded in a recording stage 38. The recording takes place in a line-by-line fashion by use of either a modulated laser or electron beam.

The scanning can be accomplished optically by a flying spot scanning tube or a direction controlled laser beam which is followed by a photoreceiver such as a photomultiplier, a photoresistor, a photodiode, etc.

Further, the hologram can be projected onto a picture tube of high resolution, as for example a return beam vidicon and the resulting charge distribution can then be electronically scanned. For further reference please see Eastman F. H. III "A High-Resolution Image Sensor" Journal of the Society of Motion Picture and Television Engineers 79 (1970), pages 10–15. In both cases an electrical signal results which corresponds to $H(x)$ of FIG. 1. The D.C. value of this signal can of course be removed simply by capacitor or transformer coupling. The A.C. component can be transformed into the signal of FIG. 2 very simply by subjecting it to a limiter stage and using as a pulse former a Schmitt trigger or similar circuit. The output of the Schmitt trigger may then be differentiated and used to trigger a monostable multivibrator, thereby transforming the signal of FIG. 2 into that shown in FIG. 2*a*. Further a regenerative pulse circuit can also be used to convert the signal of FIG. 1 directly into that of FIG. 2*a*.

Recording of the phase information is effectively accomplished by laser beam recording or a flying spot scanning tube, when the recording material is light sensitive. A particularly good resolution is furnished by recording systems using electron beam recording.

Two real time methods may also be used:

In a TITUS tube, the phase profile is recorded on electro-optical material by means of an electron beam. A coherent light bundle reflected at the tube has differing optical path length depending upon the charge at the location of the reflection.

The eidophor method also uses a similar control of the optical wavelength of an electron beam.

A further possibility for reproduction is the use of the lumatron tube wherein a real time phase profile is recorded on a thermoplastic screen by means of an electron beam. Also see W. E. Glenn, R. J. Doyle "Lumatron-A Light Valve Storage Display" proceedings SPSE, two-day seminar: Novel Audio-Visual Imaging Systems, New York, Sept. 23–24, 1971.

A great many other embodiments are possible. However the basic thought in every case is that the phase information of the hologram is transformed into a sequence of pulses of equal width and then summing the pulses either with respect to time or with respect to space. The resulting intensity distribution is then recorded on a recording medium which reproduces the phase distribution of the object wave as a distribution of optical path length (refractive index $n$; thickness $d$ of the medium). As already mentioned, amplitude demodulation plays a definitely secondary roll.

The function $\tau_1(x,y) \cdot A(x,y)$ then yields the complete object wave field.

The above-described method and arrangement have been disclosed relative to a monochromatic picture. A color picture can be verified by an additive combination of three of such images in combination with a correspondingly rastered three-color amplitude mask.

While the invention has been illustrated and described as embodied in a specific demodulating and recording arrangement and steps, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims:

What is claimed as new and desired to be protected by Letters Patent is set forth in the claims is:

1. Method for recording the phase distribution of an object wave stored in a hologram, said hologram having a density distribution having a plurality of maxima, comprising, in combination, the steps of furnishing a pulse grating having a pulse for each of said maxima and summing the so-furnished pulses thereby creating a phase signal; and recording said phase signal.

2. Method as set forth in claim 1, wherein said step of recording said phase signal comprises bleaching a photographic layer.

3. Method as set forth in claim 1, wherein said recording of said phase signal comprises recording on photoplastic film.

4. Method as set forth in claim 1, wherein said step of recording said phase signal comprises recording said phase signal on thermoplastic material.

5. Method as set forth in claim 1, wherein said step of recording said phase signal comprises recording on bichromate gelatin.

6. Method as set forth in claim 1, wherein said step of recording said phase signal comprises recording on lithium niobate crystals.

7. Method as set forth in claim 1, wherein said step of recording said phase signal comprises recording said phase signal on a gelatin layer.

8. Method as set forth in claim 1, further comprising the step of projecting said hologram onto a camera tube having high resolution, thereby creating a charge distribution; and electrically scanning said charge distribution.

9. Method as set forth in claim 1, wherein said step of summing said so-furnished pulses comprises scanning said pulse grating in such a manner that a pulse sequence having a plurality of pulses separated in time, each corresponding to one of said pulses of said pulse grating is created; and wherein said step of furnishing a sum signal comprises summing said pulses in said pulse sequence with respect to time, thereby creating said phase signal.

10. Method as set forth in claim 9, wherein said step of scanning comprises scanning at constant speed.

11. Method as set forth in claim 1, wherein said hologram has a predetermined area; and wherein said step of furnishing said pulse grating comprises furnishing a pulse grating having an area exceeding said predetermined area.

12. Method as set forth in claim 1, wherein said step of recording said phase signal comprises the step of engraving said phase signal into solid material, thereby creating a relief corresponding to said phase signal.

13. Method as set forth in claim 12, wherein said relief is engraved on light refractive material.

14. Method as set forth in claim 12, wherein said relief is creating in metallic material.

15. Method as set forth in claim 14, further comprising the step of copying said relief on said metallic material in such a manner as to create a relief on light refractive material.

16. Method as set forth in claim 1, wherein said step of summing said pulses comprises summing said pulses with respect to space.

17. Method as set forth in claim 16, wherein said step of summing said pulses with respect to space creates a sum signal having an average rate of change with respect to distance; further comprising the steps of adding an unmodulated intensity signal having a rate of change of opposite sign to said sum signal, thereby creating a signal having a D.C. component; and separating said D.C. component from said signal.

18. A method as set forth in claim 17, wherein said step of adding an unmodulated intensity signal comprises the step of photographically adding an unmodulated intensity signal; and wherein said step of separating said DC component from said signal comprises separating said DC component from said signal by a photographic threshold process.

19. Method as set forth in claim 16, wherein said step of summing said pulses with respect to space comprises the steps of transducing said pulses into electrical pulses; electrically summing said so-created electrical pulses thereby creating an electrical sum signal having a rate of change with respect to time; adding a sawtooth signal having a rate of change of opposite sign to said electrical sum signal, thereby creating a signal having a D.C. component; and separating said D.C. component from said so-created signal.

20. Method as set forth in claim 19, wherein separating said D.C. component from said signal creates an A.C. signal; further comprising the steps of converting said A.C. signal into a pulse sequence having pulses of a first pulse width; differentiating said pulses, thereby creating trigger signals; and creating pulses having a pulse width narrower than said first pulse width in response to each of said trigger signals.

21. Method as set forth in claim 1, wherein said step of furnishing a pulse grating comprises photographically making a hard copy of said hologram, thereby creating a first grating having first pulses having a first pulse width; and changing the width of said first pulses thereby creating a second pulse grating having second pulses having a second pulse width differing from said first pulse width.

22. Method as set forth in claim 21, wherein said first step of changing the width of said pulses comprises electrophotographically decreasing the width of said pulses.

23. Method as set forth in claim 21, wherein said step of changing said width of said first pulses comprises photographically decreasing said width of said first pulses.

24. Method as set forth in claim 23, wherein said step of photographically decreasing said width of said first pulses comprises copying said first grating and overexposing during said copying.

25. Method as set forth in claim 23, wherein said step of photographically decreasing said first width of said pulses comprises copying said first grating with utilization of the "neighborhood effect."

26. Method as set forth in claim 23, wherein said step of photographically decreasing said first width of said pulses comprises copying said first grating with a non-sharp mask.

27. Method as set forth in claim 23, wherein said step of photographically decreasing said width of said first pulses comprises copying said first grating on equidensity film.

28. Arrangement for recording the phase distribution of an object wave stored in a hologram, said hologram having a density distribution having a plurality of maxima, comprising, in combination, demodulating means for phase-demodulating said hologram thereby creating a phase signal, said demodulating means comprising means for furnishing a first pulse grating having a pulse for each of said maxima, and adding means for adding said pulses thereby creating a sum signal, said sum signal constituting said phase signal; and recording means for recording said phase signal.

29. An arrangement as set forth in claim 28, wherein said demodulating means comprise scanning means for scanning said hologram in a line-by-line scan in such a manner that light signals are created, each corresponding to the density of said hologram at a predetermined location therein; photoelectrical transducing means positioned in the path of said light signals for creating an electrical signal whenever one of said light signals has an intensity exceeding a predetermined intensity; illuminating means for furnishing a light beam travelling along a predetermined path to said hologram; light barrier means positioned in said predetermined path for transmitting light to said hologram only in response to said electrical signals, thereby creating a sequence of light pulses; scanning edge means positioned in the path of said light pulses from said hologram to said recording medium; and means for moving said scanning edge means relative to said recording medium at a constant velocity.

30. An arrangement as set forth in claim 29, wherein said light barrier is a Kerr cell.

31. An arrangement as set forth in claim 29, wherein said illuminating means comprise a laser for furnishing a laser beam, a semitranslucent mirror positioned in the path of said laser beam for splitting said laser beam into a first beam travelling along said predetermined path and a second beam; and wherein said scanning means comprise a mirror reflecting said second beam through said hologram onto said photoelectrical transducing means.

32. An arrangement as set forth in claim 29, wherein said demodulating means comprise optical scanning means for scanning said hologram, thereby creating scanned light signals; and a photochrome layer positioned behind said hologram for receiving said scanned light signals for furnishing a light pulse when the intensity of said scanned light signals exceeds a predetermined intensity.

33. An arrangement as set forth in claim 29, wherein said demodulating means comprise optical scanning means for scanning said hologram, thereby furnishing scanned light signals; further comprising a layer of liquid crystals and a photoconductive layer positioned relative to said hologram for receiving said scanned light signals and furnishing a pulse when the intensity of said scanned light signals exceeds a predetermined intensity.

34. An arrangement as set forth in claim 29, wherein said demodulating means comprise optical scanning means for scanning said hologram and furnishing scanned light signals, and a dye-laser layer positioned behind said hologram for receiving said scanned light signals and furnishing a pulse when the intensity of said scanned light signals exceeds a predetermined intensity.

35. An arrangement as set forth in claim 28, further comprising means for creating a second pulse grating having pulses of a pulse width less than the pulse width of said pulses in said first grating; and wherein said adding means add said pulses in said second grating.

36. An arrangement as set forth in claim 35, wherein said adding means comprise a laser furnishing a laser beam, a cylinder lens positioned between said laser and said second pulse grating for focussing said laser beam onto said second pulse grating, a second cylinder lens having a cylinder axis perpendicular to the cylinder axis of said first cylinder lens arranged between said second pulse grating and said recording medium for focussing light from said laser beam transmitted through said second pulse grating onto said recording medium, and scanning edge means positioned between said second cylinder lens and said recording medium and moving at a determined velocity relative to said recording medium in the direction of scan.

37. An arrangement as set forth in claim 36, wherein said laser beams scan said second pulse grating at a first predetermined velocity; and wherein said scanning edge means moves relative to said recording medium at a second predetermined velocity different from said first predetermined velocity.

38. An arrangement as set forth in claim 35, wherein said adding means comprise illuminating means for illuminating said second pulse grating; scanning means for scanning said so-illuminated second pulse grating in a line-by-line scan; scanning slit means positioned in front of said recording means in the path of light from said scanning means to said recording means; and means for moving said recording means past said scanning slit means.

39. An arrangement as set forth in claim 38, wherein said scanning means comprise a pinhole, and moving means for moving said pinhole in a direction perpendicular to the scanning direction upon completion of each line scan, thereby creating a line-by-line scan.

40. An arrangement as set forth in claim 35, wherein said adding means comprise illuminating means for illuminating said second grating, scanning edge means for scanning said so-illuminated second grating at a constant velocity, scanning slit means positioned in front of said recording means in the path of light from said second grating, and moving means for moving said recording means past said scanning slip means in a direction parallel to said scanning edge means.

41. An arrangement as set forth in claim 40, wherein said scanning edge means comprise solid opaque material having a sharp edge.

42. An arrangement as set forth in claim 40, wherein said illuminating means comprise a source of illumination, and a diffuser positioned between said source of illumination and said second pulse grating.

43. An arrangement as set forth in claim 40, wherein said illuminating means comprise a light source, a first cylinder lens having a cylinder axis in a predetermined direction, a second cylinder lens having a cylinder axis perpendicular to said cylinder axis of said first cylinder lens; wherein said scanning slit means comprises opaque material having a scanning slit; further comprising a third cylinder lens having a cylinder axis perpendicular to said scanning slit arranged between said scanning edge means and said scanning slit means, for focussing said second pulse grating onto said recording medium through said scanning slit.

44. An arrangement as set forth in claim 43, further comprising a grey wedge positioned before said recording medium in the path of said light for adding an unmodulated intensity signal having a rate of change with respect to distance of opposite sign to said sum signal, thereby creating a combined signal having a DC component; and wherein said recording medium requires a predetermined threshold intensity for recording, thereby creating a threshold for removing said DC component.

* * * * *